United States Patent
Lim et al.

(10) Patent No.: US 9,495,662 B2
(45) Date of Patent: Nov. 15, 2016

(54) METHOD AND APPARATUS FOR STORING TELEPHONE NUMBERS IN A PORTABLE TERMINAL

(75) Inventors: Heui-Do Lim, Suwon-si (KR); Yun-Seon Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 156 days.

(21) Appl. No.: 13/346,685

(22) Filed: Jan. 9, 2012

(65) Prior Publication Data
US 2012/0185495 A1     Jul. 19, 2012

(30) Foreign Application Priority Data
Jan. 13, 2011   (KR) .................. 10-2011-0003443

(51) Int. Cl.
*G06F 17/30* (2006.01)
*G06Q 10/10* (2012.01)

(52) U.S. Cl.
CPC .................. *G06Q 10/109* (2013.01)

(58) Field of Classification Search
USPC ........................................... 707/758
See application file for complete search history.

(56) References Cited

U.S. PATENT DOCUMENTS

| | | | | |
|---|---|---|---|---|
| 7,068,768 B2* | 6/2006 | Barnes | ...................... | 379/142.15 |
| 2003/0091173 A1* | 5/2003 | DeSalvo | .................. | 379/142.01 |
| 2004/0076139 A1* | 4/2004 | Kang-Yeh et al. | ........... | 370/349 |
| 2005/0107949 A1* | 5/2005 | Yokota | ............... | G01C 21/3611 |
| | | | | 701/532 |
| 2006/0161858 A1* | 7/2006 | Hawkins | ............... | G06F 1/1632 |
| | | | | 715/780 |
| 2007/0035513 A1* | 2/2007 | Sherrard | ............. | G06F 3/04817 |
| | | | | 345/157 |
| 2007/0111714 A1* | 5/2007 | Edwards | ........................ | 455/415 |
| 2007/0244907 A1* | 10/2007 | Hedloy | ............. | G06F 17/30067 |
| 2007/0264977 A1* | 11/2007 | Zinn | ............... | H04M 1/274525 |
| | | | | 455/414.1 |

(Continued)

FOREIGN PATENT DOCUMENTS

| KR | 20040026716 A | 4/2004 |
|---|---|---|
| KR | 20060002434 A | 1/2006 |
| KR | 10-2010-0108784 | 10/2010 |

OTHER PUBLICATIONS

Translated Korean Preliminary Rejection dated Nov. 18, 2015 in connection with Korean Patent Application No. 10-2011-0003443, 12 pages.

(Continued)

*Primary Examiner* — Shyue Jiunn Hwa

(57) ABSTRACT

A method and apparatus for storing a telephone number in a portable terminal. The method includes the steps of providing a user with a name input request message; determining whether or not the inputted name exists in a phone book list of the portable terminal; and generating a new entry including the inputted name and its associated telephone number and adding the new entry to the phone book list when the inputted name does not exist in the phone book list.

15 Claims, 3 Drawing Sheets

(56) References Cited

U.S. PATENT DOCUMENTS

| | | | |
|---|---|---|---|
| 2008/0082934 A1* | 4/2008 | Kocienda et al. | 715/773 |
| 2008/0122796 A1* | 5/2008 | Jobs | G06F 3/0488 345/173 |
| 2008/0174570 A1* | 7/2008 | Jobs | G06F 3/0488 345/173 |
| 2008/0218810 A1* | 9/2008 | Itoh | G06F 21/6227 358/440 |
| 2008/0299953 A1* | 12/2008 | Rao | G06Q 10/10 455/414.1 |
| 2009/0054092 A1* | 2/2009 | Stonefield | G06Q 30/0601 455/466 |
| 2009/0152349 A1* | 6/2009 | Bonev | G06Q 30/00 235/383 |
| 2009/0216569 A1* | 8/2009 | Bonev | G06F 17/30029 705/5 |
| 2009/0240428 A1* | 9/2009 | Shahrestani | G01C 21/3611 701/533 |
| 2009/0259493 A1* | 10/2009 | Venon | G06F 19/322 705/3 |
| 2009/0271407 A1* | 10/2009 | Hawkins | H04M 1/0254 |
| 2010/0306185 A1* | 12/2010 | Smith | G06Q 10/107 707/709 |
| 2011/0112944 A1* | 5/2011 | Ingman, Sr. | G06Q 30/04 705/34 |
| 2011/0225048 A1* | 9/2011 | Nair | G06Q 30/02 705/14.66 |
| 2011/0319061 A1* | 12/2011 | Schmackpfeffer | H04L 12/587 455/415 |
| 2012/0150955 A1* | 6/2012 | Tseng | 709/204 |
| 2014/0149463 A1* | 5/2014 | Uola | G06Q 10/107 707/792 |

OTHER PUBLICATIONS

Notice of Final Rejection dated Apr. 27, 2016 in connection with Korean Patent Application No. 10-2011-0003443, 8 pages.

* cited by examiner

METHOD AND APPARATUS FOR STORING TELEPHONE NUMBERS IN A PORTABLE TERMINAL

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Jan. 13, 2011 and assigned Serial No. 10-2011-0003443, the entire disclosure of which is hereby incorporated by reference.

TECHNICAL FIELD OF THE INVENTION

The present invention generally relates to portable terminals, and more particularly, to a method and apparatus for storing a telephone number in a portable terminal.

BACKGROUND OF THE INVENTION

Portable terminals often have a phone book function for storing one or more telephone numbers. Generally, the phone book stores a name associated with a telephone number with one or more telephone numbers. Multiple telephone numbers may be registered for each name. The multiple telephone numbers may include, for example, a cellular phone number, a telephone number of home, a telephone number of company, and a fax number associated with a name. Recently the information included in the phone book may also include an e-mail address. In addition, the portable terminal may include a storage area for storing the phone book information, and may be configured to display an interface screen for registering multiple telephone numbers for a name using the interface screen.

In some cases, however, storing a telephone number which does not store in the phone book, the terminal is implemented two cases. For example, the terminal calls for storing a telephone number in the memory or storing by the method for adding the telephone number to an existing name.

For example, the user interface of a phone book function often includes a menu request input of a name when storing an entry for the first time. When a user inputs a new name, the terminal stores the new name in a phone book memory area of the terminal. However, if the user does not know or remember the name associated with the telephone number, it may be stored under a different name, a condition that may cause problems with the organization of the phone book.

Also, when a user inputs a corresponding name after selecting a menu saving to an existing name which a user is thinking to exist in the phone book, the user can save the corresponding telephone number by selecting the existing name in case of being the existing name. When the existing name does not exist in the phone book list, it occurs an inconvenient problem to have to be inputted a name again after a controller of the terminal stores to an original new name again or returns to a selecting menu according to storing to the existing name by recognizing a phone book saving failure.

SUMMARY OF THE INVENTION

To address the above-discussed deficiencies of the prior art, it is a primary object to provide a method and apparatus for storing a telephone number in a portable terminal such that the name is only entered one time.

Another aspect of the present invention is to provide a method and apparatus for storing a telephone number of a portable terminal that does not store a same name having a same telephone number in a phone book.

Still another aspect of the present invention is to provide a method and apparatus for storing telephone number in a portable terminal for storing a telephone number by initially inputting a name and selecting a menu that includes other similar names.

In accordance with an aspect of the present invention, a method comprises providing a user with a name input request message upon a telephone number store request; checking whether or not the inputted name exists in a phone book list of the portable terminal; and generating a new entry including the inputted name and the telephone number associated with the inputted name in the phone book list when the inputted name does not exist in the phone book list.

In accordance with another aspect of the present invention, a portable terminal for storing telephone number comprises a display unit for displaying a name input request message, a key input unit for inputting a user name, a memory for storage of a phone book list, and a controller for generating the name input request message and displaying the name input request message on the display unit, and generate a new entry name according to whether or not the inputted name is similar to an existing name in the phone book list.

Before undertaking the DETAILED DESCRIPTION OF THE INVENTION below, it may be advantageous to set forth definitions of certain words and phrases used throughout this patent document: the twins "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF THE INVENTION

FIGS. 1 through 3B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminal. Hereinafter, the exemplary embodiments of the present invention will be described in detail with reference to the accompanying drawings. However, in the following description, well-known functions or constructions are not omitted detailed description in case that a detailed description is judged to obscure a major point of the invention.

Figure 1:
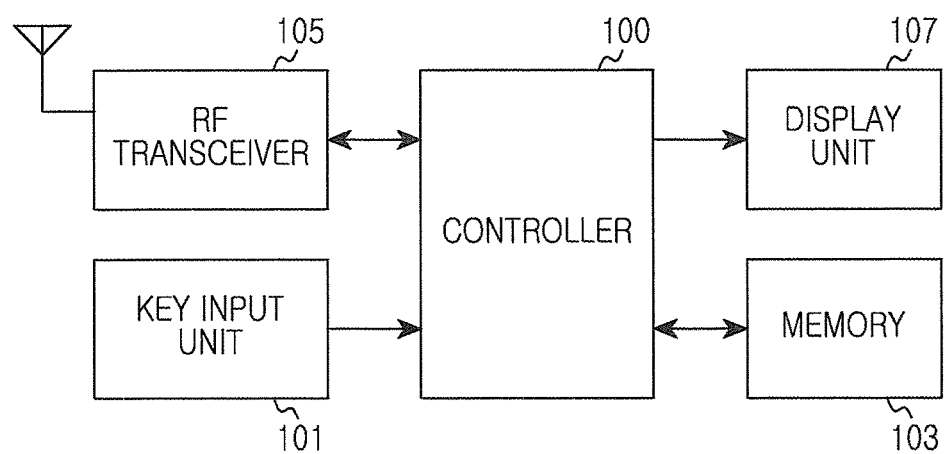
FIG. 1 illustrates an example portable terminal according to an embodiment of the present invention.

FIG. 1 illustrates an example portable terminal according to an embodiment of the present invention.

The portable terminal comprises a controller 100, a key input unit 101, a memory 103, an RF transceiver 105 and a display unit 107.

The controller 100 controls the overall functions of the portable terminal, displays a name input request message on the display unit 107 when detecting an telephone input request according to the present invention, and determines whether an inputted name is a new name or not after the inputted name matches a name stored in an existing phone book. Also, when an inputted name already exists, the controller 100 displays the existing name, which may be selected by the user to store the existing name along with its corresponding telephone number in the phone book.

The RF transceiver 105 converts received RF signals via an antenna to the baseband frequency, which may include dispreading and the channel decoding of the received RF signal when receiving an RF signal. The RF transceiver 105 may also transmit a signal by generating RF signals from baseband signals that have been channel coded and spreaded using common modulation and coding techniques.

The memory 103 stores names of the phone book. The memory 103 may also store a recently inputted name and its corresponding telephone number.

The controller 100 displays, on the display unit 107, a phone book saving request screen and a list stored in a phone book and so forth so as to display the information to a user.

The key input unit 101 uses as an input means for inputting a name by a user, and provides the inputted name information to the controller 100.

Figure 2:
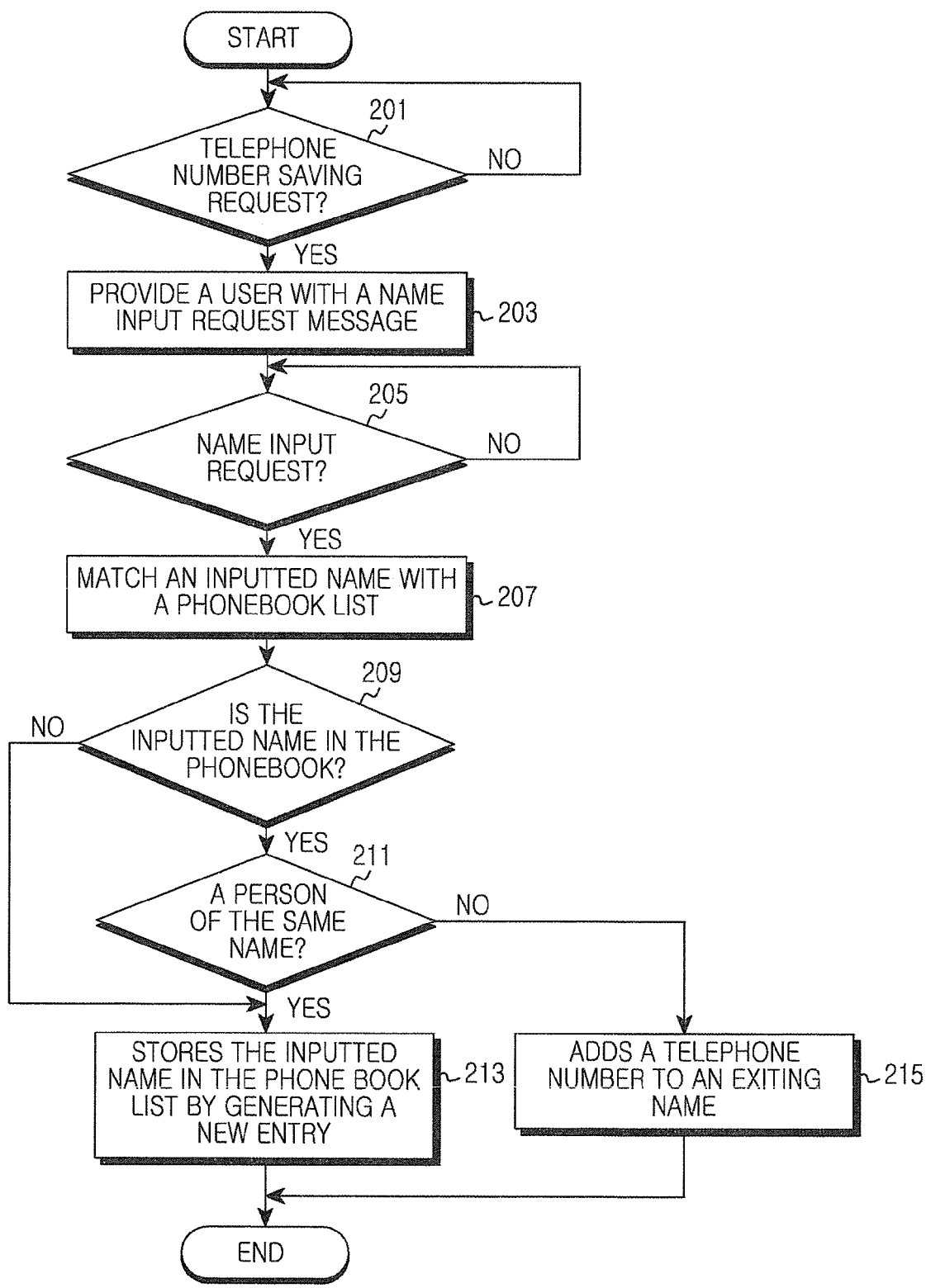
FIG. 2 illustrates an example process for storing a telephone number in a portable terminal according to an embodiment of the present invention.

FIG. 2 illustrates an example process for storing a telephone number in a portable terminal according to an embodiment of the present invention.

Figure 3B:
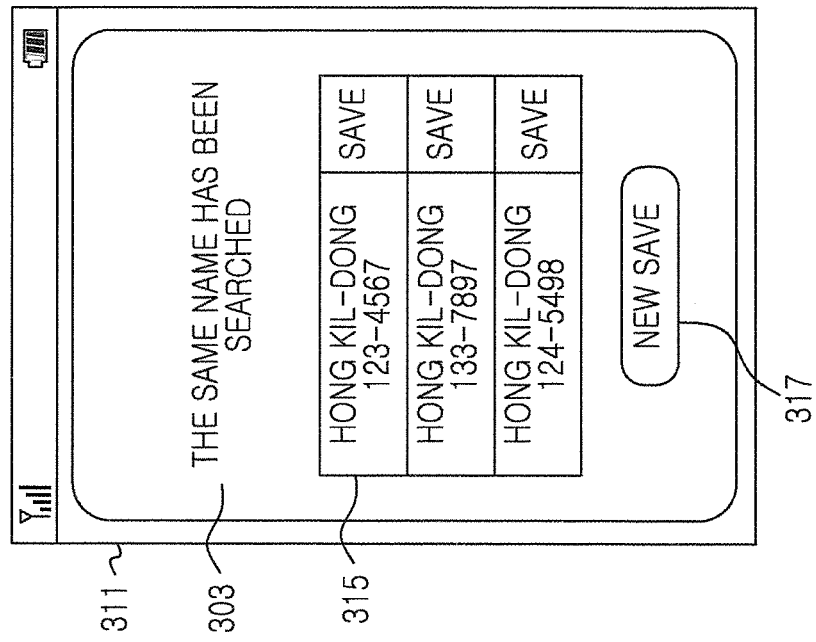
FIGS. 3A and 3B illustrate example screens that may be displayed by a portable terminal in accordance with storing the telephone number according to an embodiment of the present invention.
Figure 3A:
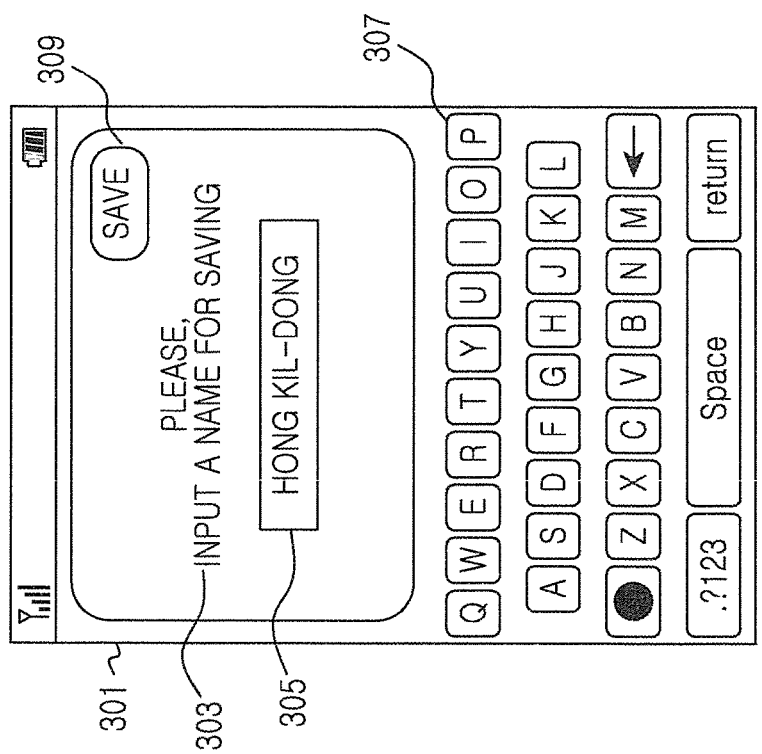

FIGS. 3A and 3B illustrate example screens displayed in a portable terminal in accordance with storing the telephone number according to an embodiment of the present invention.

FIG. 3A illustrates a screen 301 that may be generated by the controller to display a name input request message. FIG. 3B illustrates another screen 311 that may be generated by the controller displaying a request for the user to match an inputted name and a phone book list after receiving a previously inputted name.

As shown in FIG. 2, the controller 100 determines whether or not a telephone number save request is detected in block 201. This may include a user selection of a corresponding telephone number in an existing call history list or selection of a save button on the portable terminal.

Upon detecting the telephone number save request, the controller 100 provides the name input request message in block 203. That is, as shown in FIG. 3A, the controller 100 generates and displays a message requesting input of a name on the input screen 305. In certain cases where the display unit is a touch screen, the display unit can be displayed along with a keyboard. The keyboard can be a custom keyboard or a standard QWERTY keyboard. The input of the name may be completed by pressing a save button 309 on the display.

Once the input of the name is complete in block 205, the controller 100 matches the inputted name with other name stored in the phone book list in block 207.

That is, the controller 100 matches an inputted name with the phone book list in block 207, and determines whether an existing name exists in the phone book list in block 209. If the inputted name is not in the phone book list, the controller 100 proceeds to block 213, generates a new entry, stores the entry along with a telephone number in the phone book list of the portable terminal in block 215 after which the process ends.

However, in block 209, if the inputted name exists in the phone book list in block 209, as shown in FIG. 3B, the controller 100 displays a list 315 of similar names with a phrase which a same name is searched which may be selected by a user.

Therefore, in case the inputted name in block 209 already exists in the phone book list, the controller 100 proceeds to block 211, and determines whether or not a presently inputted name and a name existing in the phone book list are two different people with the same name. In case the names refer to two different people, the controller 100 proceeds to block 213, and stores a new entry including the inputted name with it associated telephone number in the phone book list. However, when the person of same name is not in block 211, the controller 100 proceeds to block 215, additionally stores a telephone number to an existing name in the phone book list in which the process ends.

In some embodiments, the controller 100 may search for and display one or more similar names on the display unit 107 while a name is inputted at block 205. That is, the controller 100 may search for other similar names while the name is inputted.

Certain embodiments of the method and apparatus for storing a telephone number in a portable terminal may provide an increased convenience by storing, without a separate menu operation, a new name or an existing name associated with a telephone number by inputting a name only once.

On the other hand, while the present invention has been particularly shown and described with reference to exemplary embodiments thereof, it will be understood by those skilled in the art that various changes in form and details may be made therein without departing from the spirit and the scope of the present invention as defined by the appended claims.

What is claimed is:

1. A method comprising:
    displaying a call history list on a touch display screen;
    detecting a touch input of selecting a telephone number on the call history list from a user while displaying the call history list on the touch display screen, wherein the selected telephone number is not stored in a phone book list of a portable terminal;
    displaying a screen for inputting, via a keyboard displayed on the screen, a name for the selected telephone number;
    in response to detecting the touch input of selecting the telephone number on the call history list and an inputting a name for a phone book list entry for the selected telephone number via the keyboard, determining whether at least one entry having a same name as the inputted name for the phone book list entry for the selected telephone number not being stored in the phone book list is already stored in the phone book list of the portable terminal;

when at least one entry having the same name as the inputted name is already stored in the phone book list, displaying, via the touch display screen, the at least one entry having the same name as the inputted name;

in response to a request for adding the selected telephone number into an existing entry, while displaying the at least one entry having the same name as the inputted name, adding the telephone number into one entry among the at least one entry having the same name as the inputted name; and in response to a request for generating a new entry, while displaying the at least one entry having the same name as the inputted name, generating the new entry having the inputted name associated with the selected telephone number in the phone book list, wherein the name inputted via the keyboard is displayed on an area separate from an area where the keyboard is displayed.

2. The method of claim 1, further comprising:
generating the new entry comprising the inputted name and the telephone number to store in the phone book list in response to there not being at least one entry in the phone book list having the same name as the inputted name.

3. The method of claim 1, further comprising searching for the at least one entry having the same name as the inputted name while the inputted name is input.

4. The method of claim 1, wherein each of the at least one entry having the same name as the inputted name includes a respective telephone number.

5. The method of claim 1, wherein the at least one entry having the same name as the inputted name is displayed in a list on the touch display screen.

6. A portable terminal comprising:
a touch display screen;
a memory to store a phone book list; and
a controller configured:
to display a call history list via the touch display screen;
to detect a touch input of selecting a telephone number on the call history list from a user while displaying the call history list on the touch display screen, wherein the selected telephone number is not stored in the phone book list of the portable terminal;
to display, via the touch display screen, a screen for inputting, via a keyboard displayed on the screen, a name for the selected telephone number;
in response to detecting the touch input of selecting of the telephone number on the call history list and an inputting a name for a phone book list entry for the selected telephone number via the keyboard, to determine whether at least one entry having a same name as the inputted name for the phone book list entry for the selected telephone number not being stored in the phone book list is already stored in the phone book list of the portable terminal;
when at least one entry having the same name as the inputted name is already stored in the phone book list, to display, via the touch display screen, the at least one entry having the same name as the inputted name;

in response to a request for adding the selected telephone number into an existing entry, while displaying the at least one entry having the same name as the inputted name, to add the telephone number into one entry among the at least one entry having the same name as the inputted name; and in response to a request for generating a new entry, while displaying the at least one entry having the same name as the inputted name, to generate the new entry having the inputted name associated with the selected telephone number in the phone book list, wherein the name inputted via the keyboard is displayed on an area separate from an area where the keyboard is displayed.

7. The portable terminal of claim 6, wherein the controller is configured to generate the new entry comprising the inputted name and the telephone number to store in the phone book list in response to there not being at least one entry in the phone book list having the same name as the inputted name.

8. The portable terminal of claim 6, wherein the controller is configured to search for the at least one entry having the same name as the inputted name while the inputted name is being inputted.

9. The portable terminal of claim 6, wherein each of the at least one entry having the same name as the inputted name includes a respective telephone number.

10. The portable terminal of claim 6, wherein the at least one entry having the same name as the inputted name is displayed in a list on the touch display screen.

11. A non-transitory computer readable medium embodying a computer program that, when executed by a processor, causes the processor to:
display a call history list on a touch display screen;
detect a touch input of selecting a telephone number on the call history list from a user while displaying the call history list on the touch display screen, wherein the selected telephone number is not stored in a phone book list of the portable terminal;
display a screen for inputting, via a keyboard displayed on the screen, a name for the selected telephone number;
in response to detecting the touch input of selecting the telephone number on the call history list and an inputting a name for a phone book list entry for the selected telephone number via the keyboard, determine whether at least one entry having a same name as the inputted name for the phone book list for the selected telephone number not being stored in the phone book list is already stored in the phone book list of the portable terminal;
when at least one entry having the same name as the inputted name is already stored in the phone book list, display, via the touch display screen, the at least one entry having the same name as the inputted name;
in response to a request for adding the selected telephone number into an existing entry, while displaying the at least one entry having the same name as the inputted name, add the telephone number into one entry among the at least one entry having the same name as the inputted name; and
in response to a request for generating a new entry, while displaying the at least one entry having the same name as the inputted name, generate the new entry having the inputted name associated with the selected telephone number in the phone book list, wherein the name inputted via the keyboard is displayed on an area separate from an area where the keyboard is displayed.

12. The non-transitory computer readable medium of claim 11, wherein the computer program further causes, when executed by the processor, the processor to:
generate the new entry comprising the inputted name and the telephone number to store in the phone book list in response to there not being at least one entry in the phone book list having the same name as the inputted name.

13. The non-transitory computer readable medium of claim 11, wherein the computer program further causes, when executed by the processor, the processor configured to:
search for the at least one entry having the same name as the inputted name while the inputted name is being inputted.

14. The non-transitory computer readable medium of claim 11, wherein each of the at least one entry having the same name as the inputted name includes a respective telephone number.

15. The non-transitory computer readable medium of claim 11, wherein the at least one entry having the same name as the inputted name are displayed in a list on the touch display screen.

* * * * *